US011054835B2

(12) United States Patent
Turpin et al.

(10) Patent No.: US 11,054,835 B2
(45) Date of Patent: Jul. 6, 2021

(54) VEHICLE COLLISION AVOIDANCE

(71) Applicant: QUALCOMM Incorporated, San Diego, CA (US)

(72) Inventors: Matthew Hyatt Turpin, Waltham, MA (US); Stephen Marc Chaves, Philadelphia, PA (US)

(73) Assignee: QUALCOMM Incorporated, San Diego, CA (US)

(*) Notice: Subject to any disclaimer, the term of this patent is extended or adjusted under 35 U.S.C. 154(b) by 187 days.

(21) Appl. No.: 16/360,596

(22) Filed: Mar. 21, 2019

(65) Prior Publication Data
US 2019/0220041 A1  Jul. 18, 2019

Related U.S. Application Data

(63) Continuation of application No. 15/607,975, filed on May 30, 2017, now Pat. No. 10,289,121.
(Continued)

(51) Int. Cl.
G05D 1/10 (2006.01)
G08G 5/00 (2006.01)
G06K 9/00 (2006.01)
G05D 1/02 (2020.01)
G05D 1/00 (2006.01)
(Continued)

(52) U.S. Cl.
CPC ......... G05D 1/0223 (2013.01); G05D 1/0088 (2013.01); G06K 9/00637 (2013.01);
(Continued)

(58) Field of Classification Search
CPC .... G05D 1/0223; G05D 1/0088; G05D 1/106; G06K 9/00637; G08G 5/0013;
(Continued)

(56) References Cited

U.S. PATENT DOCUMENTS 8,849,483 B2   9/2014  Kuwata et al.
9,046,372 B2   6/2015  Mathews et al.
(Continued)

FOREIGN PATENT DOCUMENTS

WO   2016033795 A1   3/2016

OTHER PUBLICATIONS

Alonso-Mora J., et al., "Collision Avoidance for Aerial Vehicles in Multi-Agent Scenarios", Autonomous Robots, vol. 39, No. 1, Jan. 25, 2015, pp. 101-121.
(Continued)

Primary Examiner — Brian P Sweeney
(74) Attorney, Agent, or Firm — The Marbury Law Group, PLLC

(57) ABSTRACT

Embodiments include devices and methods for vehicle collision avoidance. A processor of the vehicle may receive lidar sensor data comprising one or more points including a distance and a direction from the vehicle to the one or more points. The processor may determine a velocity constraint for each of the one or more points based on the distance and direction from the vehicle to the one or more points. Based on a navigation instruction, the processor may determine one or more velocity solutions that satisfy the one or more velocity constraints. The processor may select a velocity solution from the determined one or more velocity solutions based on the navigation instruction, and may adjust a vehicle velocity based on the selected velocity solution.

27 Claims, 7 Drawing Sheets

Related U.S. Application Data

(60) Provisional application No. 62/421,551, filed on Nov. 14, 2016.

(51) Int. Cl.
  *G08G 5/04* (2006.01)
  *G01S 13/935* (2020.01)

(52) U.S. Cl.
  CPC ......... *G08G 5/0013* (2013.01); *G08G 5/0069* (2013.01); *G08G 5/0086* (2013.01); *G08G 5/045* (2013.01); *G01S 13/935* (2020.01)

(58) Field of Classification Search
  CPC .... G08G 5/0069; G08G 5/0086; G08G 5/045; G01S 13/935
  See application file for complete search history.

(56) References Cited

U.S. PATENT DOCUMENTS

| | | |
|---|---|---|
| 2006/0058931 A1* | 3/2006 | Ariyur ................ G08G 5/0052 701/23 |
| 2015/0105946 A1 | 4/2015 | Kumar et al. |
| 2016/0216710 A1 | 7/2016 | Hu et al. |
| 2016/0304198 A1 | 10/2016 | Jourdan |
| 2018/0136669 A1 | 5/2018 | Turpin et al. |

OTHER PUBLICATIONS

International Search Report and Written Opinion—PCT/US17/054291—ISA/EPO—dated Dec. 14, 2017. 12 pages.

* cited by examiner

VEHICLE COLLISION AVOIDANCE

RELATED APPLICATIONS

This application is a continuation of U.S. Non-Provisional patent application Ser. No. 15/607,975 entitled "Vehicle Collision Avoidance" filed May 30, 2017, which claims priority to U.S. Provisional Patent Application No. 62/421,551 entitled "Vehicle Collision Avoidance" filed Nov. 14, 2016, the entire contents of both of which are hereby incorporated by reference in their entirety.

BACKGROUND

Vehicles in motion, and in particular semi-autonomous and robotic vehicles, eventually encounter the challenges of obstacle avoidance. While manned vehicles may rely on a human operator to sense obstacles and make real-time navigational decisions to avoid a collision, remotely controlled vehicles and semi-autonomous vehicles must rely on automated techniques of obstacle avoidance.

SUMMARY

Various embodiments include methods that may be implemented by a processor of a vehicle for avoiding a collision with an object. Various embodiments may include receiving sensor data comprising one or more points, determining a distance and a direction from the vehicle to the one or more points, determining a velocity constraint for each of the one or more points based on the determined distance and direction from the vehicle to each of the one or more points, determining one or more velocity solutions that satisfy the determined velocity constraints based on a vehicle navigation instruction, selecting a velocity solution from the determined one or more velocity solutions based on the vehicle navigation instruction, and adjusting a vehicle velocity based on the selected velocity solution. In some embodiments, receiving sensor data may include receiving unprocessed sensor data. In some embodiments, the velocity constraint for each of the one or more points may include a velocity inequality constraint.

In some embodiments, determining the distance and the direction from the vehicle to the one or more points may include determining a distance and a direction from the vehicle to an obstacle. In some embodiments, the obstacle may include an obstacle represented by the one or more points.

In some embodiments, determining a velocity constraint for each of the one or more points based on the determined distance and direction from the vehicle to each of the one or more points may include determining a velocity constraint for each of the one or more points based on the determined distance and direction from the vehicle to an obstacle represented by the one or more points.

In some embodiments, the vehicle navigation instruction may include a direction component, and selecting the velocity solution from the determined one or more velocity solutions based on the vehicle navigation instruction may include selecting the velocity solution having a direction component that most closely matches the direction component of the vehicle navigation instruction. In some embodiments, the vehicle navigation instruction may include a speed component, and selecting the velocity solution from the determined one or more velocity solutions based on the vehicle navigation instruction may include selecting the velocity solution having a speed component that most closely matches the speed component of the navigation instruction.

Further embodiments may include a vehicle including a processor configured with processor-executable instructions to perform operations of the methods summarized above. Further embodiments may include a vehicle including means for performing functions of the methods summarized above. Further embodiments may include processor-readable storage media on which are stored processor executable instructions configured to cause a processor of a vehicle to perform operations of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

DETAILED DESCRIPTION

Figure 1:
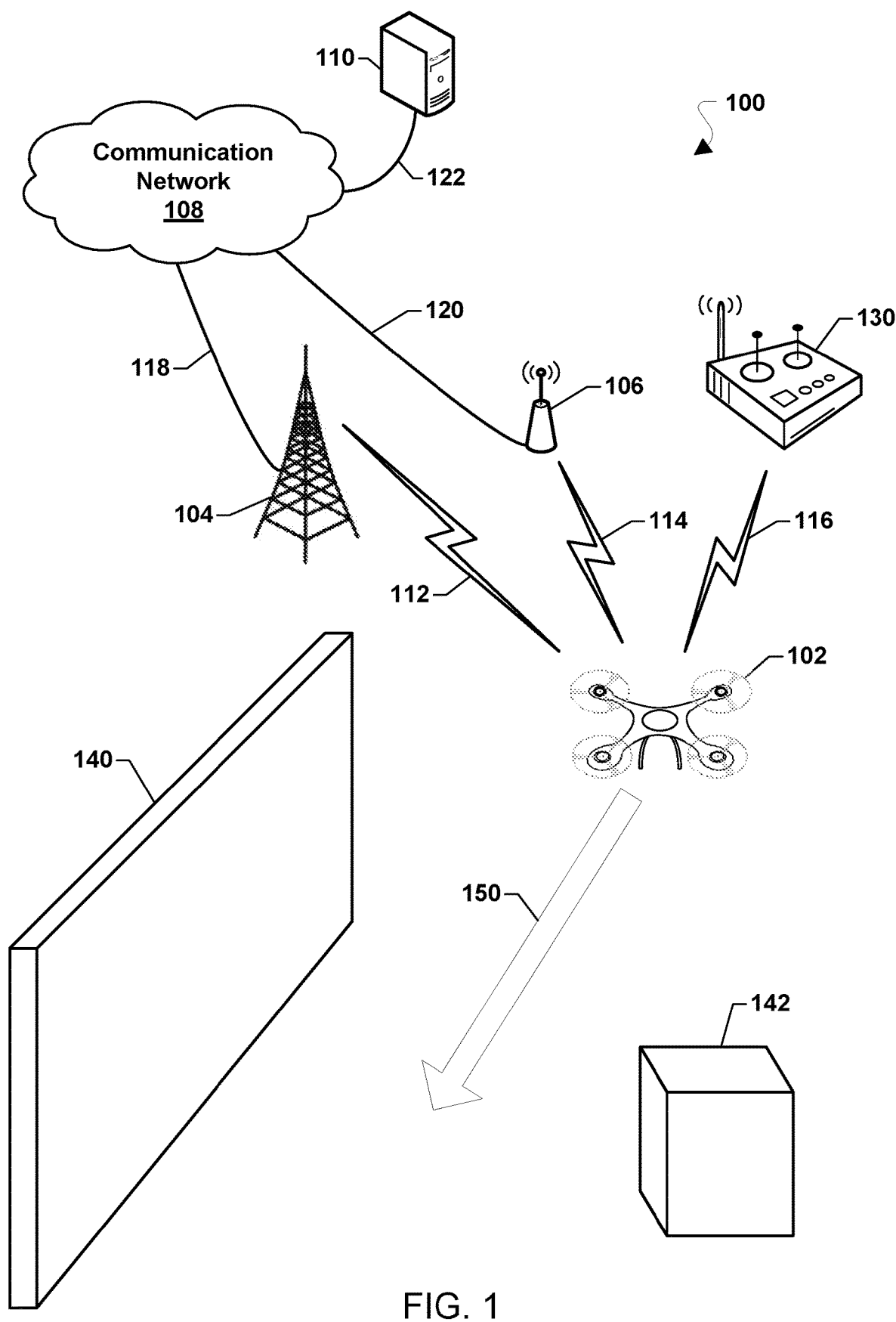
FIG. 1 is a system block diagram of a vehicle operating within a communication system according to various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments include methods that may be implemented by a processor of a vehicle, and may improve the operation of the vehicle by enabling the vehicle to avoid a collision with an obstacle. In some embodiments, the processor may receive sensor data including one or more points, and the processor may determine a distance and a direction from the vehicle to the one or more points. In some embodiments, the processor may determine a distance and a direction from the vehicle to the one or more points, and may determine a velocity constraint for each of the one or more points based on the determined distance and direction to each of the one or more points. In some embodiments, the processor may determine a distance and a direction from the vehicle to an obstacle that may be represented by the one or more points, and may determine a velocity constraint for the obstacle. In some embodiments, the processor may determine a velocity constraint for each of the one or more points. The processor may receive or acquire a navigation input that may include an input velocity, and may use the input velocity and the one or more velocity constraints to determine a velocity solution that satisfies all of the velocity constraints. Various embodiments also may improve the operation of the vehicle by adjusting the vehicle velocity to closely match the navigation instruction. Various embodiments also may improve the operation of the vehicle by reducing a computational burden on the processor of the vehicle by identifying one or more points from among a group of points (which may include a very large group of points), and determining a velocity constraint for each of the one or more identified points. In various embodiments, the processor may use the velocity constraints to place bounds on the vehicle velocity.

As used herein, the term "vehicle" refers to one of various types of robotic vehicles and semi-autonomous vehicles. A vehicle may include an onboard computing device configured to maneuver and/or navigate the vehicle with some remote operating instruction or updates to instructions stored in a memory of the onboard computing device. In some implementations, a vehicle may be an aerial vehicle propelled for flight using a plurality of propulsion units, each including one or more rotors, that provide propulsion and/or lifting forces for the vehicle. In some implementations, a vehicle may be a land-based vehicle, a water-borne vehicle, or an underwater vehicle. Vehicle propulsion units may be powered by one or more types of electric power sources, such as batteries, fuel cells, motor-generators, solar cells, or other sources of electric power, which may also power the onboard computing device, navigation components, and/or other onboard components.

Vehicles in motion, and in particular semi-autonomous and robotic vehicles, eventually encounter the challenges of obstacle avoidance. While manned vehicles may rely on a human operator to sense obstacles and make real-time navigational decisions to avoid a collision, remotely controlled vehicles and semi-autonomous vehicles must rely on automated techniques of obstacle avoidance.

Various embodiments provide methods implemented by a processor of a vehicle for avoiding a collision with an object. In various embodiments, the processor of the vehicle may detect an obstacle, for example from information received by a sensor of the vehicle. The processor may determine a distance between the vehicle and the obstacle and an angle to the obstacle, and may determine a velocity constraint for the obstacle. The processor may receive or acquire a navigation instruction, which may include an input velocity. The processor may determine one or more velocity solutions based on the input velocity that satisfies the velocity constraint. The processor may select a velocity solution based on the navigation instruction, and the processor may adjust a vehicle velocity based on the selected velocity solution. In some embodiments, the velocity constraint may include a maximum velocity that the vehicle may attain without colliding into the obstacle.

Various embodiments may be implemented within a vehicle operating within a variety of communication systems 100, an example of which is illustrated in FIG. 1. With reference to FIG. 1, the communication system 100 may include a vehicle 102, a vehicle controller 130, a base station 104, an access point 106, a communication network 108, and a network element 110.

The base station 104 and the access point 106 may provide wireless communications to access the communication network 108 over a wired and/or wireless communications backhaul 118 and 120, respectively. The base station 104 may include base stations configured to provide wireless communications over a wide area (e.g., macro cells), as well as small cells, which may include a micro cell, a femto cell, a pico cell, and other similar network access points. The access point 106 may include access points configured to provide wireless communications over a relatively smaller area. Other examples of base stations and access points are also possible.

The vehicle 102 may communicate with the vehicle controller 130 over a wireless communication link 116. The vehicle controller 130 may provide flight and/or navigation instructions to the vehicle 102. The vehicle 102 may also communicate with the base station 104 over a wireless communication link 112, and with the access point 106 over a wireless communication link 114. The wireless communication links 112 and 114 may include a plurality of carrier signals, frequencies, or frequency bands, each of which may include a plurality of logical channels. The wireless communication links 112 and 114 may utilize one or more radio access technologies (RATs). Examples of RATs that may be used in a wireless communication link include 3GPP Long Term Evolution (LTE), 3G, 4G, 5G, Global System for Mobility (GSM), Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee®, Bluetooth®, and Bluetooth Low Energy (LE)®.

The network element 110 may include a network server or another similar network element. The network element 110 may communicate with the communication network 108 over a communication link 122. The vehicle 102 and the network element 110 may communicate via the communication network 108. The network element 110 may provide the vehicle 102 with a variety of information, such as navigation information, weather information, information about local air, ground, and/or sea traffic, movement control instructions, and other information, instructions, or commands relevant to operations of the vehicle 102.

In various embodiments, the vehicle 102 may move through an environment on a path of motion 150. As the vehicle 102 moves through the environment, the vehicle may detect an obstacle, such as an obstacle 140 or an obstacle 142. Obstacles may pose a risk of collision for the vehicle 102. Some obstacles, such as the obstacle 142, may be relatively smaller and possible to avoid or to navigate around. Some obstacles, such as the obstacle 140, may include obstacles that are not possible to avoid or navigate around, such as a wall or a similar barrier.

Figure 2:
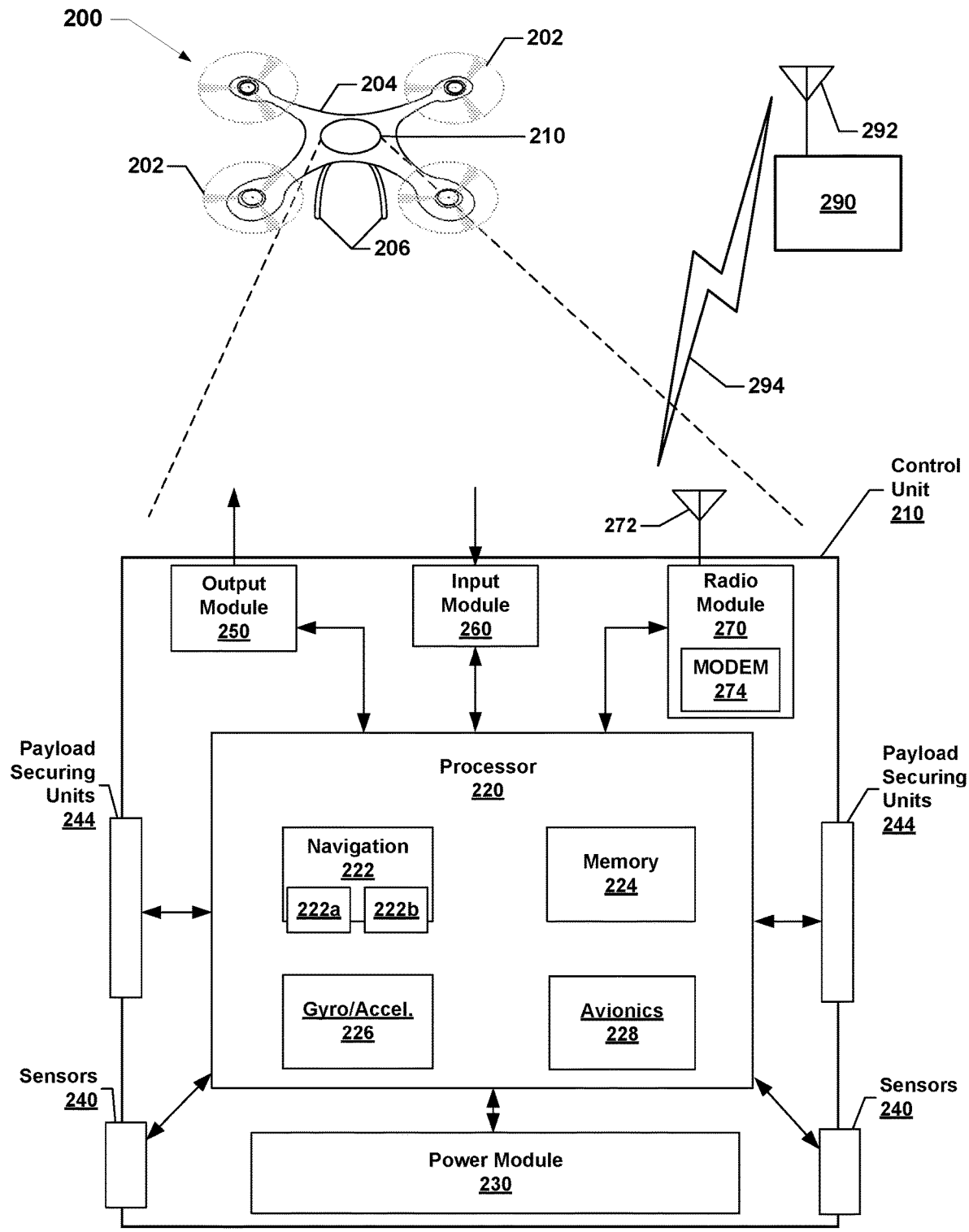
FIG. 2 is a component block diagram illustrating components of a vehicle according to various embodiments.

Vehicles may include a variety of designs. FIG. 2 illustrates an example vehicle 200 that may utilize various embodiments. While the vehicle 200 is illustrated having an aerial design, this illustration is not intended to imply or require that various embodiments are limited to rotorcraft vehicles, or to aerial vehicles. Various embodiments may be used with winged vehicles, as well ground vehicles, motor vehicles, and underwater vehicles. It will also be appreciated that vehicles of other designs may include elements that are analogous to the elements described below with respect to the aerial vehicle 200, and may include other elements as well, as appropriate to the particular vehicle design.

With reference to FIGS. 1 and 2, the vehicle 200 may be similar to the vehicle 102. The vehicle 200 utilizes one or more rotors 202 driven by corresponding motors to provide lift-off (or take-off) as well as other aerial movements (e.g., forward progression, ascension, descending, lateral movements, tilting, rotating, etc.). The vehicle 200 may include a number of rotors 202, a frame 204, and landing columns 206 or skids. The frame 204 may provide structural support for the motors associated with the rotors 202. The landing columns 206 may support the maximum load weight for the combination of the components of the vehicle 200 and, in some cases, a payload. For ease of description and illustration, some detailed aspects of the vehicle 200 are omitted such as wiring, frame structure interconnects, or other features that would be known to one of skill in the art. For example, while the vehicle 200 is shown and described as having a frame 204 having a number of support members or frame structures, the vehicle 200 may be constructed using a molded frame in which support is obtained through the molded structure. While the illustrated vehicle 200 has four rotors 202, this is merely exemplary and various embodiments may include more or fewer than four rotors 202.

The vehicle 200 may further include a control unit 210 that may house various circuits and devices used to power and control the operation of the vehicle 200. The control unit 210 may include a processor 220, a power module 230, sensors 240, payload-securing units 244, an output module 250, an input module 260, and a radio module 270.

The processor 220 may be configured with processor-executable instructions to control travel and other operations of the vehicle 200, including operations of various embodiments. The processor 220 may include or be coupled to a navigation unit 222, a memory 224, a gyro/accelerometer unit 226, and an avionics module 228. The processor 220 and/or the navigation unit 222 may be configured to communicate with a server through a wireless connection (e.g., a cellular data network) to receive data useful in navigation, provide real-time position reports, and assess data.

The avionics module 228 may be coupled to the processor 220 and/or the navigation unit 222, and may be configured to provide travel control-related information such as altitude, attitude, airspeed, heading, and similar information that the navigation unit 222 may use for navigation purposes, such as dead reckoning between Global Navigation Satellite System (GNSS) position updates.

The gyro/accelerometer unit 226 may include an accelerometer, a gyroscope, an inertial sensor, or other similar sensors. The avionics module 228 may include or receive data from the gyro/accelerometer unit 226 that provides data regarding the orientation and accelerations of the vehicle 200 that may be used in navigation and positioning determinations.

The processor 220 may further receive additional information from the sensors 240, such as an image sensor or optical sensor (e.g., capable of sensing visible light, infrared, ultraviolet, and/or other wavelengths of light). The sensors 240 may also include a radio frequency (RF) sensor, a barometer, a sonar emitter/detector, a radar emitter/detector, a microphone or another acoustic sensor, or another sensor that may provide information usable by the processor 220 for movement operations as well as navigation and positioning determinations and calculations. The sensors 240 may include contact or pressure sensors that may provide a signal that indicates when the vehicle 200 has made contact with a surface. The payload-securing units 244 may include an actuator motor that drives a gripping and release mechanism and related controls that are responsive to the control unit 210 to grip and release a payload in response to commands from the control unit 210. In various embodiments, the control unit 210 may be equipped with an input module 260, which may be used for a variety of applications. For example, the input module 260 may receive images or data from an onboard camera or sensor, or may receive electronic signals from other components (e.g., a payload).

In some embodiments, the navigation unit 222 may include modules for performing various different functions, such as a flight controller module 222a and a path planner module 222b. The flight controller module 222a may perform calculations and send instructions to various motor controllers and/or actuators on the vehicle 200 related to moment-to-moment control of vehicle movements. The flight controller module 222a may use information from one or more of the gyro/accelerometer unit 226, the avionics module 228, and the sensors 240. The path planner module 222b may perform calculations and determinations related to global path planning (in contrast to moment-to-moment control of movements of the vehicle 200) and may send path information to the flight controller module 222a.

The power module 230 may include one or more batteries that may provide power to various components, including the processor 220, the sensors 240, the payload-securing units 244, the output module 250, the input module 260, and the radio module 270. In addition, the power module 230 may include energy storage components, such as rechargeable batteries. The processor 220 may be configured with processor-executable instructions to control the charging of the power module 230 (i.e., the storage of harvested energy), such as by executing a charging control algorithm using a charge control circuit. Alternatively or additionally, the power module 230 may be configured to manage its own charging. The processor 220 may be coupled to the output module 250, which may output control signals for managing the motors that drive the rotors 202 and other components.

The vehicle 200 may be controlled through control of the individual motors of the rotors 202 as the vehicle 200 progresses toward a destination. The processor 220 may receive data from the navigation unit 222 and use such data in order to determine the present position and orientation of the vehicle 200, as well as the appropriate course towards the destination or intermediate sites. In various embodiments, the navigation unit 222 may include a GNSS receiver system (e.g., one or more global positioning system (GPS) receivers) enabling the vehicle 200 to navigate using GNSS signals. In some embodiments, the navigation unit 222 may receive or determine a position derived from image-based systems, such as visual-inertial odometry. Alternatively or in addition, the navigation unit 222 may be equipped with radio navigation receivers for receiving navigation beacons or other signals from radio nodes, such as navigation beacons (e.g., very high frequency (VHF) omni-directional range (VOR) beacons), Wi-Fi access points, cellular network sites, radio station, remote computing devices, other UAVs, etc.

The radio module 270 may be configured to receive navigation signals, such as signals from aviation navigation facilities, etc., and provide such signals to the processor 220 and/or the navigation unit 222 to assist in vehicle navigation. In various embodiments, the navigation unit 222 may use signals received from recognizable RF emitters (e.g., AM/FM radio stations, Wi-Fi access points, and cellular network base stations) on the ground.

The radio module 270 may include a modem 274 and a transmit/receive antenna 272. The radio module 270 may be configured to conduct wireless communications with a vehicle controller 290, as well as with a wireless telephony base station or cell tower (e.g., the base station 104), a network access point (e.g., the access point 106), a beacon, a smartphone, a tablet, or another computing device with which the vehicle 200 may communicate (such as the network element 110). The processor 220 may establish a bi-directional wireless communication link 294 via the modem 274 and the antenna 272 of the radio module 270 and the wireless communication device 290 via a transmit/receive antenna 292. In some embodiments, the radio module 270 may be configured to support multiple connections with different wireless communication devices using different radio access technologies.

While various components of the control unit 210 are illustrated as separate components, some or all of the components (e.g., the processor 220, the output module 250, the radio module 270, and other units) may be integrated together in a single device or module, such as a system-on-chip module.

Figure 3:
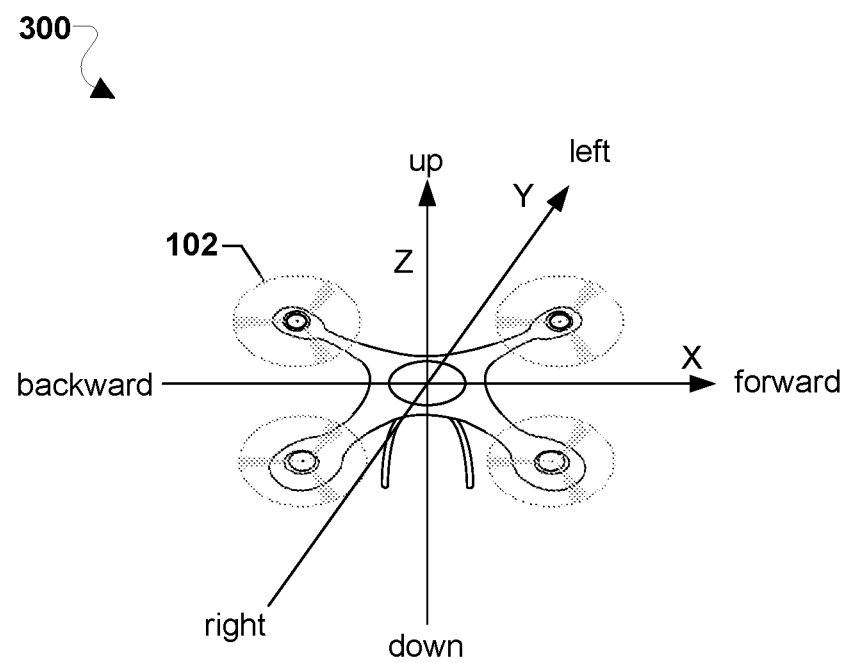
FIG. 3 illustrates a body coordinate system of a vehicle according to various embodiments.

In some embodiments, a robotic or semiautonomous vehicle may sense its environment and or make certain navigational and/or flight decisions based on a frame or body coordinate system. FIG. 3 illustrates an example of a three-axis body frame coordinate system 300. With reference to FIGS. 1-3, in some embodiments, a processor of a vehicle (e.g., the processor 220) may determine a direction and a distance from the vehicle to an obstacle (or to a point, as further described below) relative to the body frame coordinate system. In some embodiments, the body frame coordinate system 300 may use a variety of frames, including a world frame, a body frame, a gravity-aligned body frame, and the like. In various embodiments, a processor of the vehicle (e.g., the processor 220) may denote locations relative to each of an X axis, a Y axis, and a Z axis. The processor may associate relative directions with each axis (e.g., forward and backward directions with the X axis, left and right with the Y axis, and up and down with the Z axis).

Figure 4A:
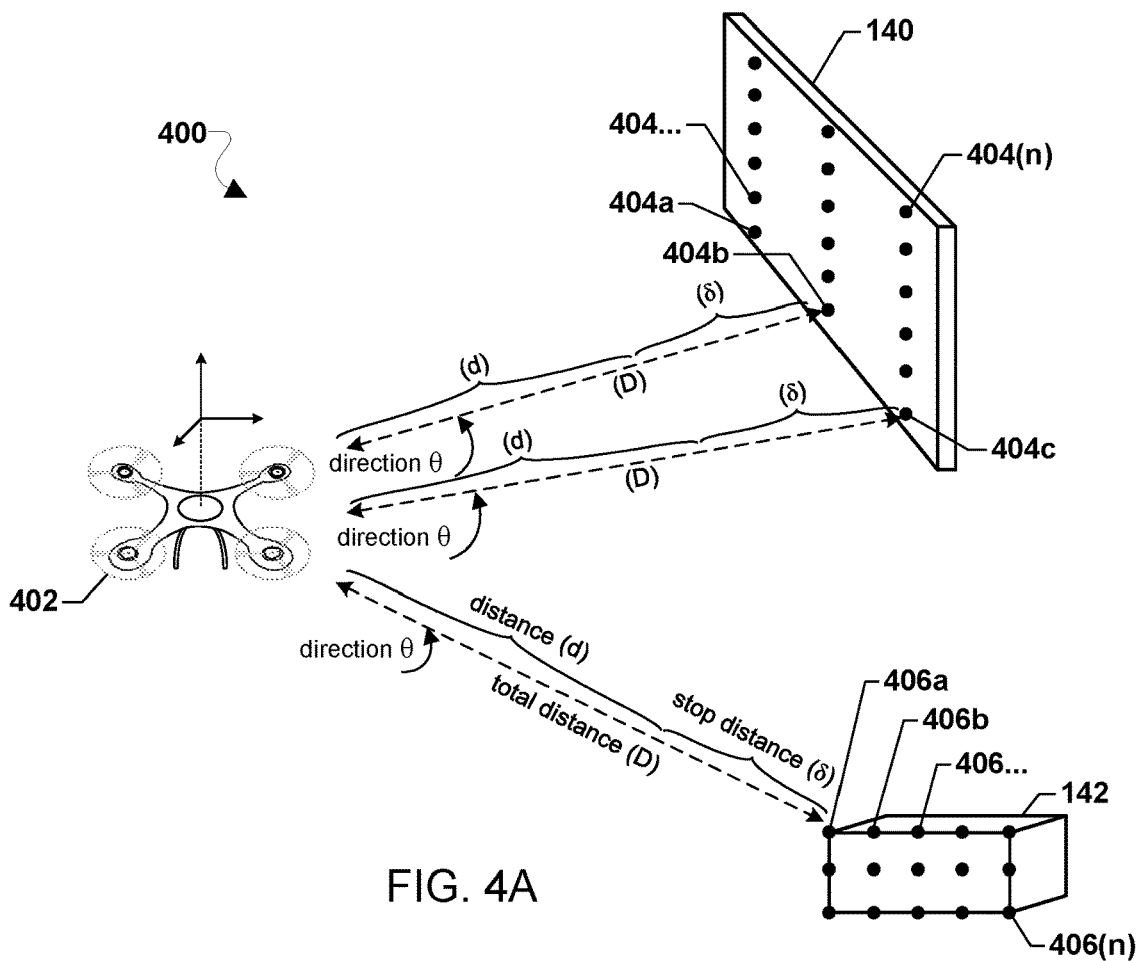
FIG. 4A illustrates a method of vehicle collision avoidance according to various embodiments.

FIG. 4A illustrates a method of vehicle collision avoidance 400 according to various embodiments. With reference to FIGS. 1-4A, a processor (e.g., the processor 220) of a vehicle 402 (which may be similar to the vehicle 102 and 200) may detect obstacles, such as the obstacles 140 and 142, using a sensor of the vehicle (such as one or more of the sensors 240). In some implementations, the sensor may obtain or receive data enabling the processor of the vehicle 402 to determine a distance and a direction (e.g., angle) from the vehicle 402 to an obstacle (e.g., the obstacles 140 and 142). The sensor may, for example, include a binocular sensor, such as a binocular camera, that may enable the processor of the vehicle 402 to obtain depth-from-stereo (DFS) information, which the processor may use to determine the distance and direction from the vehicle 402 to the obstacles 140 and 142. As another example, the sensor may include one or more of radar, lidar, sonar, or another sensor that may provide the processor with information to determine the distance and direction to the obstacles 140 and 142.

Characterizing an obstacle, such as determining a size, shape, and other characteristics of a detected obstacle, may be computationally intensive. To reduce the computational burden on the processor, in some embodiments, the processor may identify one or more points, such as the points 404(1-n) illustrated on the obstacle 140 and the points 406(1-n) illustrated on the obstacle 142. Each of the one or more points (e.g., 404(1-n) and 406(1-n)) may indicate the existence of an obstacle at the location of the point and/or may itself be the entirety of an obstacle. In some embodiments, each of the one or more points may represent an obstacle. In some embodiments, the processor may not, or may be unable to, identify any points, which may indicate that no obstacle is detected.

In some embodiments, the processor may identify one or more points, such as points 404a, 404b, 404c . . . 404(n), and points 406a, 406b . . . 406(n). In some implementations, a point may be a point on or near an obstacle (e.g., the obstacles 140 and 142), but this is not required. In some embodiments, the processor may identify one or more points from a field of view, e.g., of a sensor of the vehicle 402. For example, the processor may receive an image using a camera, and may identify one or more points in the image. In some implementations, a point may correspond to a pixel in the image. In some implementations, the processor may identify a very large number of points, such as one point for each pixel in the image. In some embodiments, the processor may reduce a processing burden by identifying fewer points. In some embodiments, the processor may reduce a processing burden by reducing a resolution of the image, thereby reducing a number of pixels from which to identify points.

In various embodiments, the processor may receive unprocessed sensor data ("raw sensor data"), such as unprocessed image data from a camera, and may not perform further processing on the received raw sensor data to recognize or identify an object represented in the sensor data. For example, the processor may not perform analyses on the sensor data to recognize, define, locate or otherwise characterize an object within the field of view of the sensor. Thus, while an object could be recognizing or characterized by processing the received raw sensor data, the various embodiments do not involve or require such computationally intensive operations. In some embodiments, the processor may not apply the unprocessed sensor data to an algorithm or formula to identify an object that is represented by the sensor data.

For each detected obstacle (e.g., 140, 142), or for each identified point (e.g., 404(1-n), 406(1-n), the processor may determine a velocity constraint that the processor may use to adjust velocity of the vehicle 402. A velocity (e.g., of the vehicle 402), and a velocity constraint, may each be a vector quantity that include a direction component and a speed component. In some embodiments, the processor of the vehicle 402 may determine a velocity constraint for each point on an obstacle. The determination of the velocity constraint may be based on a distance and a direction from the vehicle to the obstacle or the point. In various embodiments, the processor may determine new/different velocity constraints as the distance and/or direction to an obstacle or point changes. In various embodiments, the processor may determine the velocity constraints as the vehicle moves through space relative to each obstacle or point. In some embodiments, the processor may determine the velocity constraints many times per second (potentially hundreds or thousands of times per second), depending upon available processing resources and capabilities of the processor.

In various embodiments, the determined distance from the vehicle to an obstacle or point may include a stop distance. The stop distance may be a buffer distance from the obstacle (or point) at which the vehicle must stop moving toward the obstacle or point to avoid colliding with the obstacle or point. In some embodiments, the stop distance may be at least a length of the vehicle (or another measurement of a size of the vehicle). The stop distance may also include an additional distance, to provide a greater buffer between the vehicle and the obstacle or point. The processor may determine or adjust the stop distance based on a sensitivity of a vehicle sensor. For example, a binocular camera sensor may have a minimum depth perception, and the processor may determine the stop distance based on the minimum depth perception of the sensor. The processor may also determine or adjust the stop distance based on a vehicle velocity, a vehicle mass (e.g., a stopping distance of the vehicle moving at a velocity), a processing speed of the processor, and any other property that may be derived from the dynamics of the vehicle.

In some embodiments, the processor may determine a distance value "d", which may be represented as:

$$d = D - \delta \quad \text{[Equation 1]}$$

In which "D" represents a total distance from the vehicle to the obstacle or point; "δ" represents the stop distance; and "d" represents a distance from the vehicle to the stop distance (that is, the total distance less the stop distance).

In various embodiments, the processor may determine the position of the obstacle or a point by determining an angle "θ" that represents an angle between a reference axis of the body coordinate frame of the vehicle and a line extending from the vehicle to the obstacle or point. In some embodiments, the processor may determine two or more angles between two or more reference axes of the body coordinate frame and the line extending from the vehicle to the obstacle or point (e.g., one or more of an angle from an x-axis, an angle from a y-axis, and an angle from the z-axis). In various embodiments, the processor may determine new/different angles and distances as the vehicle moves relative to the obstacle or points.

Figure 4B:
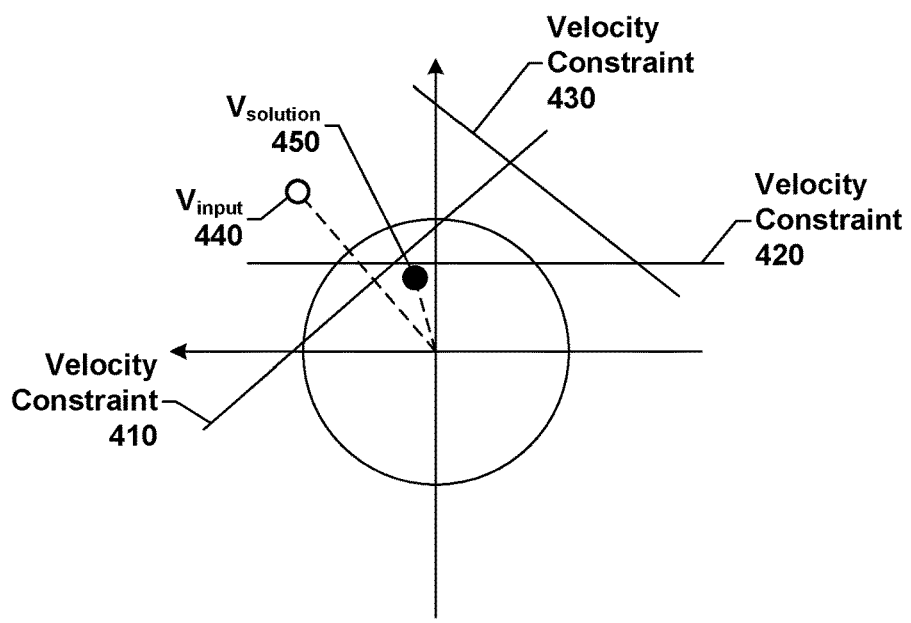
FIG. 4B illustrates a method of vehicle collision avoidance according to various embodiments.

FIG. 4B illustrates a method of vehicle collision avoidance 400 according to various embodiments. With reference to FIGS. 1-4B, a processor (e.g., the processor 220) of a vehicle 402 (which may be similar to the vehicle 102 and 200) may determine multiple velocity constraints that the processor may use to determine a velocity solution that satisfies the multiple velocity constraints. For example, for three points (e.g., the points 404b, 404c, and 406a) the processor may determine respective velocity constraints 410, 420, and 430. The processor may use the velocity constraints 410, 420, and 430 to bound or limit the velocity of the vehicle. In some embodiments, the processor may use the velocity constraints 410, 420, and 430 to bound or limit the velocity of the vehicle within a reference frame of each point (or obstacle). In some embodiments, the processor may receive navigational instruction including an input (e.g., instructed or commanded) vehicle velocity (e.g., $V_{input}$ 440), and the processor may use the velocity constraints 410, 420, and 430 and the input velocity $V_{input}$ 440 to determine one or more velocity solutions (e.g., $V_{solution}$ 450). In various embodiments, the input velocity 440 and the velocity solution 450 may each include a direction component and a speed component.

In some embodiments, a velocity constraint may represent a maximum velocity the vehicle may attain (or that the processor may permit the vehicle to attain) without colliding into the obstacle or point. The velocity constraints may be represented by the function:

$$V^2 = 2ad \quad \text{[Equation 2]}$$

in which "V" represents a velocity constraint, "a" represents a maximum acceleration (which may or may not be constant), and "d" represents the distance from the vehicle to the stop distance.

In various embodiments, the determined velocity constraint may be represented as a hyperplane defining a virtual "fence" or "barrier" between the vehicle and the obstacle or point that is located at the endpoint of the stop distance farthest from the point or obstacle. The processor may use each velocity constraint 410, 420, and 430 in determining a velocity solution that meets (e.g., is less than or equal to) each velocity constraint, thereby preventing the vehicle from travelling into the stop distance for each obstacle or point. For example, as illustrated in FIG. 4B, the input velocity $V_{input}$ 440 is beyond (illustrated as above and to the left of) the velocity constraints 410 and 420. The processor may, using the velocity constraints 410, 420, and 430 (which the processor may consider in the aggregate), return the velocity solution $V_{solution}$ 450, which is within (illustrated as below) the velocity constraints 410, 420, and 430. Thus, in some embodiments, the processor may bound or limit the velocity of the vehicle by the combined velocity constraints 410, 420, and 430.

In various embodiments, the processor may modify or adjust in navigation instruction using the velocity constraints to avoid a collision with one or more obstacles or points. For example, the vehicle may acquire a navigation instruction indicating the input velocity 440. In some embodiments, the processor may acquire the navigation instruction from a user input, such as from the controller 130. In some embodiments, the processor may acquire the navigation instruction by accessing stored navigation data that may be stored in a memory of the vehicle. In some embodiments, the processor may acquire the navigation instruction by receiving a transmission of navigation data from a remote source, such as a network element 110.

The navigation instruction may include a direction component and a speed component indicating a direction and a speed in which the vehicle should travel. If the processor determines that the desired velocity 440 exceeds one or more of the constraints 410, 420, and 430, the processor may execute an optimization function using the desired velocity 440 and the velocity constraints 410, 420, and 430 to determine velocity solutions that will satisfy (e.g., will not violate) the velocity constraints 410, 420, and 430. In some embodiments, while the velocity constraints are generated using an equality expression, each velocity constraint may be represented as inequality expression (a "velocity inequality constraint") that provides a threshold velocity, below which the processor must maintain the vehicle velocity. For example, a velocity inequality constraint may be represented by the function:

$$\frac{\vec{D_i}}{\|D_i\|} \circ \vec{V} \leq \sqrt{2ad} \quad \text{[Equation 3]}$$

in which, "$\vec{D}$" represents a vector from the vehicle to an obstacle or point "i", "a" represents the maximum acceleration (which may or may not be constant), and "d" represents the distance within which the vehicle may avoid a collision with the obstacle or point (e.g., the distance from the vehicle to the stop distance for the obstacle or point). In some embodiments, the processor may pass the velocity constraints 410, 420, 430 and the desired velocity 440 to an optimization function to produce one or more velocity solutions 450. The velocity solutions 450 may be alternate velocities that, if implemented by the navigation unit/flight controller of the vehicle, would prevent the vehicle from colliding with the obstacle(s) or point(s).

In some embodiments, the vehicle may compare one or more generated velocity solutions 450 to the desired velocity 440 and may select the velocity solution 450 that most closely matches at least one of the speed component and the direction component of the desired velocity 440. Thus, in some embodiments, the processor may select a velocity solution having a direction component that most closely matches the direction component of the navigation instruction. In some embodiments, the processor may select a velocity solution that most closely matches the speed component of the navigation instruction. In some embodiments, the processor may select a velocity solution having both a direction component and a speed component that most closely matches the direction and speed components of the navigation instruction. In some embodiments, the processor may iteratively (e.g., periodically or aperiodically) redetermine the velocity constraints 410, 420, and 430, and may redetermine velocity solutions 450 in order to avoid a collision as the vehicle moves with reference to obstacles or points. In some embodiments, the iteratively redetermination of velocity constraints and velocity solutions may enable the processor to select a determined velocity solution that most closely matches the navigation instruction. The processor may then adjust the vehicle velocity based on the selected velocity solution. In operation, the iterative redetermination of velocity constraints and velocity solutions, and the adjustment of the vehicle velocity based thereon, may enable the processor to adjust the vehicle velocity in a manner that feels natural and nondisruptive to a vehicle operator. In some implementations, where an unaltered navigation input may result in a vehicle collision with an obstacle or point, use of the determined velocity solution by the processor to adjust the vehicle velocity may cause the vehicle to move along a path that avoids collision with an obstacle or point, and may even result in motion by the vehicle that skirts along, slides along, ducks under, or slides over an obstacle or point along a path that otherwise closely matches the navigation input.

In some embodiments, the processor may use unprocessed ("raw") sensor data, and may not perform additional determination, make assumptions, and/or draw conclusions about the one or more identified points. For example, the processor may not determine a volume around the one or more points, e.g., in one or more dimensions. As another example, the processor may not determine whether the one or more points are static or in motion.

Figure 5:
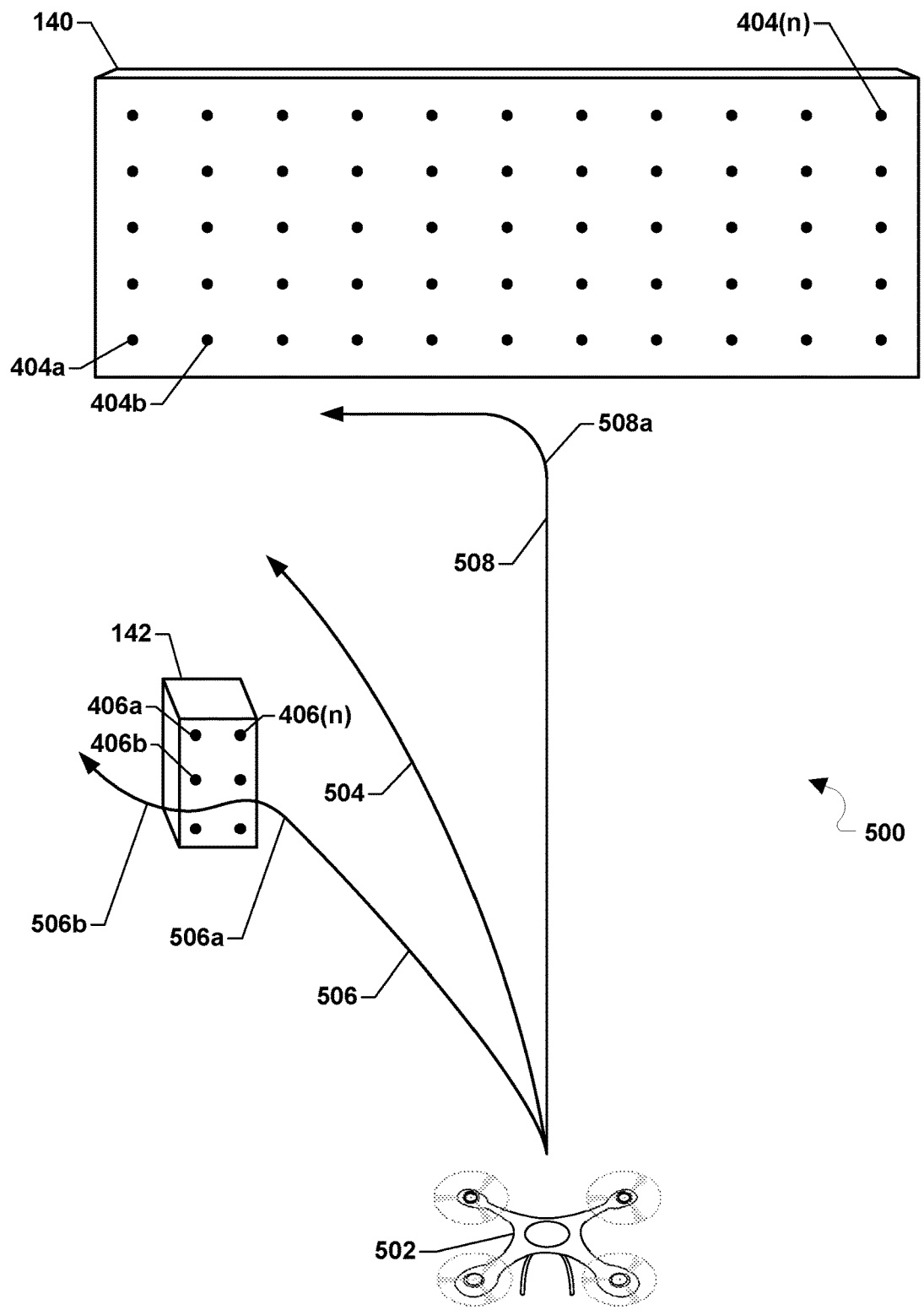
FIG. 5 illustrates a method of vehicle collision avoidance according to various embodiments.

FIG. 5 illustrates a method of vehicle collision avoidance 500 according to various embodiments. With reference to FIGS. 1-5, the method 500 may be implemented by a processor (e.g., the processor 220 and/or the like) of a vehicle (e.g., the vehicle 102, 200, and 402).

A processor of the vehicle 502 (which may be similar to the vehicle 102, 200, or 402) may acquire a navigation instruction (e.g., from a user input, stored navigation data, from the network element, etc.). The navigation instruction may include a velocity, which may include a direction component and a speed component. For example, the navigation instruction may direct the vehicle 502 along a path 504 between the obstacles 140 and 142. As another example, the navigation instruction may direct the vehicle 502 along a path 506 toward the obstacle 142 (or toward one or more of points 406a, 406b, . . . 406(n)). As another example, the navigation instruction may direct the vehicle along a path 508 toward the obstacle 140 (or toward one or more points 404a, 404b, . . . 406(n)). Travel by the vehicle 502 along the path 504 may require no adjustment to the velocity of the vehicle 502.

In contrast, following the path 506 without any adjustment to the velocity of the vehicle 502 may result in a collision between the vehicle 502 and the obstacle 142. However, having determined velocity constraints associated with the obstacle 142 (or with the points 406a, 406a, . . . 406(n)), the processor may use the velocity constraints to determine one or more velocity solutions that satisfy (e.g., are less than or equal to) the velocity constraints. In some embodiments, the processor may select the velocity solution that most closely matches the navigation instruction, and may adjust the velocity of the vehicle 502 based on the selected velocity solution.

For example, as the vehicle 502, traveling along the path 506, approaches or arrives at a location 506a that is close to the obstacle 142, regardless of the instructed velocity, the processor may determine one or more velocity solutions that satisfy the velocity constraint(s) and may adjust the vehicle velocity based on a selected velocity solution, thereby preventing the vehicle 502 from colliding with the obstacle 142. In some embodiments, the processor may select a velocity solution having a direction component that most closely matches the direction component of the navigation instruction. In some embodiments, the processor may select a velocity solution that most closely matches the speed component of the navigation instruction. In some embodiments, the processor may select a velocity solution having both a direction component and a speed component that most closely matches the direction and speed components of the navigation instruction.

For example, on the selected velocity solution, the processor may adjust the vehicle velocity, thus directing the vehicle 502 to follow a path that avoids a collision with the obstacle 142. For example, although the navigation instruction includes a velocity that would otherwise cause the vehicle 502 to collide with the obstacle 142, the processor may adjust the velocity of the vehicle 502 based on the selected velocity solution such that the vehicle 502 travels around the obstacle 142, e.g., from the location 506a to a location 506b. In various embodiments, the processor may iteratively redetermine velocity constraints based on changing distances and directions to obstacles or points. In some embodiments, when the vehicle 502 arrives at or approaches the location 506b, the processor may select another velocity solution (based, in some embodiments, on the direction component and/or the speed component of the navigation instruction) and the processor may adjust the vehicle velocity accordingly. For example, at the location 506b, the processor may again adjust the velocity of the vehicle 502 based on the direction component and/or the speed component of the navigation instruction, directing the vehicle 502 to travel using a velocity that more closely matches the velocity of the navigation instruction. While FIG. 5 illustrates two locations 506a and 506b along the path 506, in various embodiments the processor may adjust the vehicle velocity at numerous points in time. For example, the processor may iteratively redetermine a distance and a direction from the vehicle to each obstacle or point, and may iteratively redetermine velocity constraints for each obstacle or point. The processor may also determine new velocity solutions based on the redetermined velocity constraints, and may adjust the vehicle velocity based on a selected velocity solution.

As another example, based on the selected velocity solution, the processor may direct the vehicle 502 to follow the path 508, which if followed without any adjustment to the velocity of the vehicle 502 may result in the collision between the vehicle 502 and the obstacle 140. In the case where the obstacle 140 includes an obstacle that the vehicle 502 may not easily navigate around, such as a wall, the processor may determine velocity constraints, and may select a velocity solution, that prevents the vehicle 502 from colliding with the obstacle 140. In this example, since the obstacle 140 cannot be navigated around, the processor may adjust the vehicle velocity based on the selected velocity solution such that the vehicle 502 travels along a surface of the obstacle 140, such as a wall surface. Thus, in some embodiments, adjusting the vehicle velocity based on the selected velocity solution may direct the vehicle 502 to perform a "wall sliding" maneuver or to otherwise travel along a path that avoids a collision between the vehicle 502 and the obstacle 140.

In some embodiments, the processor may select a velocity solution that most closely matches the direction component and/or speed component of the navigation instruction. In some embodiments, the processor may select a velocity solution that most closely matches the direction and/or speed components of the navigation instruction such that the adjusted or resultant vehicle velocity varies from the instructed vehicle velocity as smoothly as possible. For example, the processor may select a velocity solution such that an amount of variation between the vehicle velocity of the navigation instruction and the adjusted vehicle velocity remains within a threshold variation over a period of time. In some embodiments, the processor may select a velocity solution such that one or more of the direction component and the speed component of the adjusted velocity varies from the direction component and the speed component of the navigation instruction within a threshold variation over a period of time.

The direction and speed of the adjusted velocity of the vehicle 502 may each vary independent from the direction component and the speed component of the velocity of the navigation instruction. For example, starting at the location 508a of the processor may adjust the velocity of vehicle 502 to travel in a direction that is substantially different (e.g., 90°) from the direction component of the navigation instruction, while having a speed component that may very closely match the speed component of the navigation instruction, and vice versa.

Figure 6:
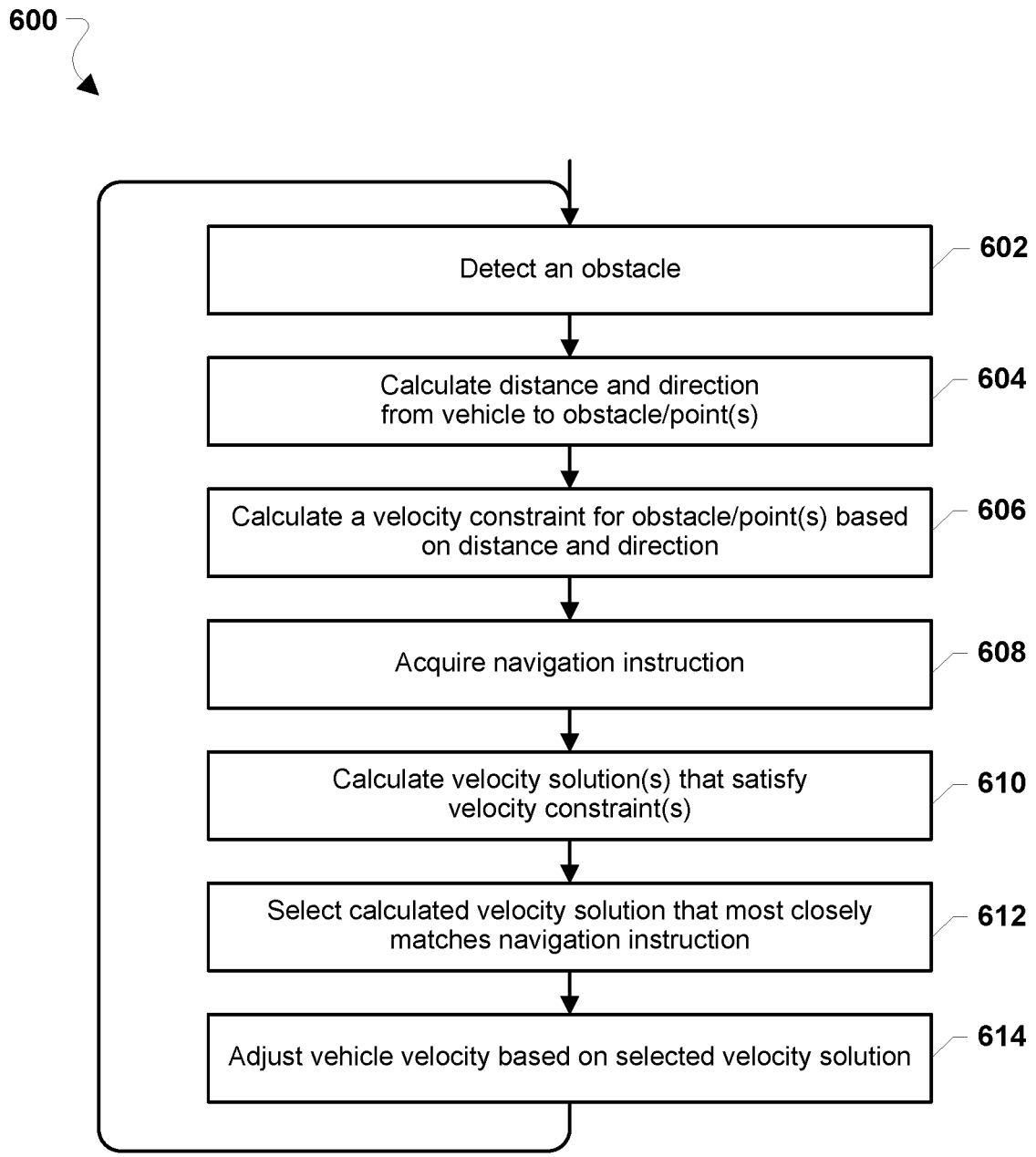
FIG. 6 is a process flow diagram illustrating a method of vehicle collision avoidance according to various embodiments.

FIG. 6 illustrates a method 600 of vehicle collision avoidance according to various embodiments. With reference to FIGS. 1-6, the method 600 may be implemented by a processor (e.g., the processor 220 and/or the like) of a vehicle (e.g., the vehicle 102, 200, 402, 502, and 602).

In block 602, the processor of the vehicle may detect an obstacle. In some embodiments, the processor of the vehicle may detect the obstacle using one or more sensors of the vehicle.

In block 604, the processor of the vehicle may determine a distance and a direction from the vehicle to the obstacle. In some embodiments, the processor may identify one or more points, and the processor may determine a distance and a direction from the vehicle to the one or more points.

In block 606, the processor may determine a velocity constraint for the obstacle based on the distance and direction to the obstacle. In some embodiments, the processor may determine a velocity constraint for each of the one or more points. In some embodiments, the processor may determine the one or more velocity constraints based on the acquired navigation instruction, which may be a reactive operation (e.g., based on the acquisition of the navigation instruction) rather than an advanced planning operation (e.g., as part of a path planning or other navigation planning operation). In some embodiments, a movement controller module (e.g., the movement controller module 222a) may determine the velocity constraints. In some embodiments, a velocity constraint may include a velocity inequality constraint.

In block 608, the processor may acquire a navigation instruction.

In block 610, the processor may determine one or more velocity solutions that satisfy the velocity constraint(s). In some embodiments, the processor may determine the one or more velocity solutions based on the acquired navigation instruction, which may be a reactive operation (e.g., based on the acquisition of the navigation instruction), rather than an advanced planning operation (e.g., as part of a path planning or other navigation planning operation). In some embodiments, a movement controller module (e.g., the flight controller module 222a) may determine the one or more velocity solutions that satisfy the velocity constraint(s).

In block 612, the processor may select a determined velocity solution from among the one or more velocity solutions that most closely matches the navigation instruction. In some embodiments, the processor may select the velocity solution based on either or both of the distance between and the direction from the vehicle and the obstacle, and the navigation instruction.

In block 614, the processor may adjust the vehicle velocity based on the selected velocity solution.

The processor may again detect an obstacle in block 602. In various implementations, the processor may repeatedly perform the operations of blocks 602-614 with respect to the same obstacle (e.g., the obstacle 140 and 142), enabling the processor to update or adjust one or more velocity constraints, and to adjust the vehicle velocity according to the updated or adjusted velocity constraint(s).

Figure 7:
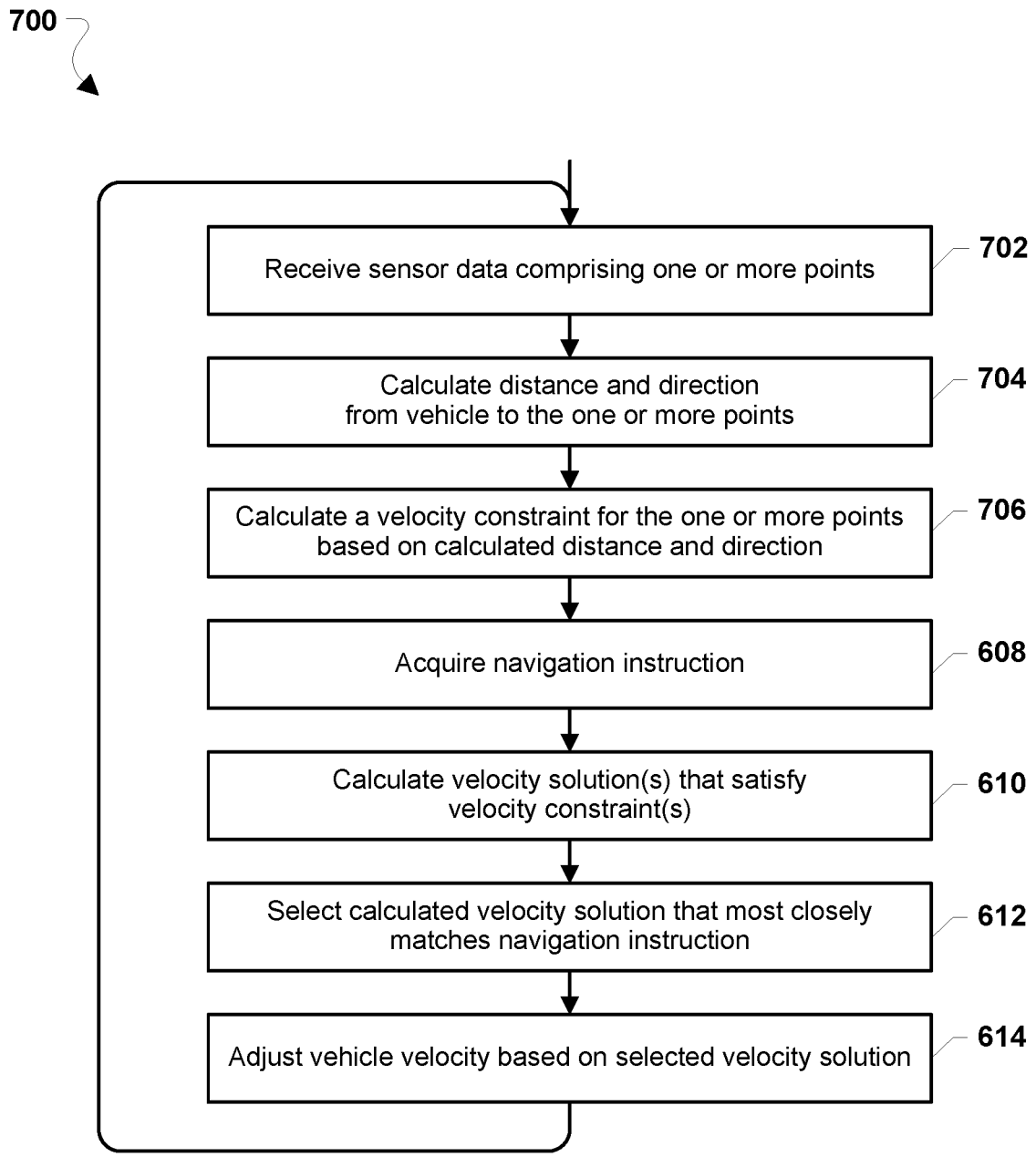
FIG. 7 is a process flow diagram illustrating a method of vehicle collision avoidance according to various embodiments.

FIG. 7 illustrates a method 700 of vehicle collision avoidance according to various embodiments. With reference to FIGS. 1-7, the method 700 may be implemented by a processor (e.g., the processor 220 and/or the like) of a vehicle (e.g., the vehicle 102, 200, 402, 502, and 602). In blocks 608-614, the device processor may perform operations of like numbered blocks of the method 600.

In block 702, the processor of the vehicle may receive sensor data including one or more points. In some embodiments, the processor may receive unprocessed or raw sensor data, such as unprocessed image data from a camera, and may not perform further processing on the received raw sensor data to recognize or identify an object represented in the sensor data. For example, the processor may not perform a determination using the sensor data to recognize, define, locate or otherwise characterize an object within the field of view of the sensor. In some embodiments, the processor may not apply the unprocessed sensor data to an algorithm or formula to identify an object that is represented by the sensor data.

Characterizing an obstacle within sensor data, such as determining a size, shape, and other characteristics of a detected obstacle, may be computationally intensive. To reduce the computational burden on the processor, in some embodiments, the processor may identify one or more points, (e.g., the points 404(1-n) illustrated on the obstacle 140 and the points 406(1-n) illustrated on the obstacle 142) without performing additional determinations, such as calculations on the raw sensor data, to detect an obstacle within the field of view of the sensor (e.g., to detect an object, or to determine a size, shape, or other characteristic of an obstacle). In some embodiments, the processor may use unprocessed (raw) sensor data, and may not perform additional determinations, calculations, make assumptions, and/or draw conclusions about the one or more identified points. For example, the processor may not determine a volume, surface or other geometric parameter around the one or more points, e.g., in one or more dimensions. As another example, the processor may not determine whether the one or more points are static or in motion.

In block 704, the processor of the vehicle may determine a distance and a direction from the vehicle to each of the one or more points. For example, the processor may receive an image using a camera, and may identify one or more points in the image. In some implementations, a point may correspond to a pixel in the image. In some implementations, the processor may identify or select a very large number of points, such as one point for each pixel in the image. In some embodiments, the processor may reduce a processing burden by identifying/selecting fewer points for determining the distance and direction. In some embodiments, the processor may reduce a processing burden by reducing the resolution of the image, thereby reducing the number of pixels from which to identify points.

In block 706, the processor may determine a velocity constraint for each of the identified one or more points based on the determined distance and direction to the point or points. In some embodiments, the processor may determine the velocity constraint for each of the identified one or more points based on the acquired navigation instruction. The acquired navigation instruction may be a reactive operation (e.g., based on the acquisition of the navigation instruction) rather than an advanced planning operation (e.g., as part of a path planning or other navigation planning operation). In some embodiments, a movement controller module (e.g., the flight controller module 222a) may determine the velocity constraints. In some embodiments, each velocity constraint may include a velocity inequality constraint.

Various embodiments enable the processor of the vehicle to avoid a collision with an object, thereby improving the operation of the vehicle. Various embodiments also improve the operation of the vehicle by adjusting the vehicle velocity to closely match (in some cases within a threshold variation) a vehicle velocity of the navigation instruction. Various embodiments also improve the operation of the vehicle by reducing a computational burden on the processor of the vehicle by assigning one or more points to the obstacle and determining velocity constraints assigned to one or more of the points.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 400, 500, 600, and 700 may be substituted for or combined with one or more operations of the methods 400, 500, 600, 700, and vice versa.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method of vehicle collision avoidance, comprising:
receiving, by a processor, lidar data comprising one or more points including a distance and a direction from a vehicle to the one or more points, wherein each of the one or more points corresponds to a pixel in an image comprising the lidar data;
determining, by the processor, a velocity constraint for each of the one or more points based on the distance and direction from the vehicle to each of the one or more points;
determining, by the processor, one or more velocity solutions that satisfy the determined velocity constraints based on a vehicle navigation instruction;
selecting, by the processor, a velocity solution from the determined one or more velocity solutions based on the vehicle navigation instruction; and
adjusting, by the processor, a vehicle velocity based on the selected velocity solution.

2. The method of claim 1, wherein the vehicle comprises a ground vehicle.

3. The method of claim 1, wherein receiving, by the processor, lidar data comprises receiving unprocessed lidar data.

4. The method of claim 1, wherein the velocity constraint for each of the one or more points comprises a velocity inequality constraint.

5. The method of claim 1, further comprising determining, by the processor, a distance and a direction from the vehicle to an obstacle on which the one or more points appear.

6. The method of claim 1, wherein determining, by the processor, one or more velocity solutions that satisfy the determined velocity constraints based on a vehicle navigation instruction comprises:
determining the one or more velocity solutions that satisfy a combination of the determined velocity constraints based on the vehicle navigation instruction.

7. The method of claim 1, wherein determining, by the processor, one or more velocity solutions that satisfy the determined velocity constraints based on a vehicle navigation instruction comprises:
executing an optimization function using the vehicle navigation instruction and the velocity constraints for each of the one or more points, wherein the vehicle navigation instruction comprises a commanded vehicle velocity.

8. The method of claim 1, wherein determining, by the processor, a velocity constraint for each of the one or more points based on the distance and direction from the vehicle to each of the one or more points comprises:
Determining a velocity constraint for each of the one or more points based on the distance and direction from the vehicle to an obstacle on which the one or more points appear.

9. The method of claim 1,
wherein the vehicle navigation instruction includes a direction component, and
wherein selecting, by the processor, the velocity solution from the determined one or more velocity solutions based on the vehicle navigation instruction comprises selecting the velocity solution having a direction component that most closely matches the direction component of the vehicle navigation instruction.

10. The method of claim 1,
wherein the vehicle navigation instruction includes a speed component, and
wherein selecting, by the processor, the velocity solution from the determined one or more velocity solutions based on the vehicle navigation instruction comprises selecting the velocity solution having a speed component that most closely matches the speed component of the vehicle navigation instruction.

11. A vehicle, comprising:
a lidar device; and
a processor coupled to the lidar device and configured with processor-executable instructions to:
receive lidar data from the lidar device, the lidar data comprising one or more points including a distance and a direction from a vehicle to the one or more points, wherein each of the one or more points corresponds to a pixel in an image comprising the lidar data;
determine a velocity constraint for each of the one or more points based on the distance and direction from the vehicle to each of the one or more points;
determine one or more velocity solutions that satisfy the determined velocity constraints based on a vehicle navigation instruction;
select a velocity solution from the determined one or more velocity solutions based on the vehicle navigation instruction; and
adjust a vehicle velocity based on the selected velocity solution.

12. The vehicle of claim 11, wherein the vehicle comprises a ground vehicle.

13. The vehicle of claim 11, wherein the processor is further configured with processor-executable instructions to receive unprocessed lidar data.

14. The vehicle of claim 11, wherein the processor is further configured with processor-executable instructions such that the velocity constraint for each of the one or more points comprises a velocity inequality constraint.

15. The vehicle of claim 11, wherein the processor is further configured with processor-executable instructions to determine a distance and a direction from the vehicle to an obstacle on which the one or more points appear.

16. The vehicle of claim 11, wherein the processor is further configured with processor-executable instructions to determine the one or more velocity solutions that satisfy a combination of the determined velocity constraints based on the vehicle navigation instruction.

17. The vehicle of claim 11, wherein the processor is further configured with processor-executable instructions to execute an optimization function using the vehicle navigation instruction and the velocity constraints for each of the one or more points, wherein the vehicle navigation instruction comprises a commanded vehicle velocity.

18. The vehicle of claim 11, wherein the processor is further configured with processor-executable instructions to determine a velocity constraint for each of the one or more points based on the distance and direction from the vehicle to an obstacle on which the one or more points appear.

19. The vehicle of claim 11,
wherein the vehicle navigation instruction includes a direction component, and
wherein the processor is further configured with processor-executable instructions to select the velocity solution having a direction component that most closely matches the direction component of the vehicle navigation instruction.

20. The vehicle of claim 11,
wherein the vehicle navigation instruction includes a speed component, and
wherein the processor is further configured with processor-executable instructions to select the velocity solution having a speed component that most closely matches the speed component of the vehicle navigation instruction.

21. A vehicle, comprising:
means for receiving lidar data comprising one or more points including a distance and a direction from a vehicle to the one or more points, wherein each of the one or more points corresponds to a pixel in an image comprising the lidar data;
means for determining a velocity constraint for each of the one or more points based on the distance and direction from the vehicle to each of the one or more points;
means for determining one or more velocity solutions that satisfy the determined velocity constraints based on a vehicle navigation instruction;
means for selecting a velocity solution from the determined one or more velocity solutions based on the vehicle navigation instruction; and
means for adjusting a vehicle velocity based on the selected velocity solution.

22. A non-transitory processor readable storage medium having stored thereon processor-executable instructions configured to cause a processor of a vehicle to perform operations comprising:
receiving lidar data comprising one or more points including a distance and a direction from a vehicle to the one or more points, wherein each of the one or more points corresponds to a pixel in an image comprising the lidar data;
determining a velocity constraint for each of the one or more points based on the distance and direction from the vehicle to each of the one or more points;
determining one or more velocity solutions that satisfy the determined velocity constraints based on a vehicle navigation instruction;
selecting a velocity solution from the determined one or more velocity solutions based on the vehicle navigation instruction; and
adjusting a vehicle velocity based on the selected velocity solution.

23. The non-transitory processor readable storage medium of claim 22, wherein the stored processor-executable instructions are configured to cause the processor of the vehicle to perform operations further comprising determining a distance and a direction from the vehicle to an obstacle on which the one or more points appear.

24. The non-transitory processor readable storage medium of claim 22, wherein the stored processor-executable instructions are configured to cause the processor of the vehicle to perform operations such that determining one or more velocity solutions that satisfy the determined velocity constraints based on a vehicle navigation instruction comprises:
determining the one or more velocity solutions that satisfy a combination of the determined velocity constraints based on the vehicle navigation instruction.

25. The non-transitory processor readable storage medium of claim 22, wherein the stored processor-executable instructions are configured to cause the processor of the vehicle to perform operations such that determining a velocity constraint for each of the one or more points based on the distance and direction from the vehicle to each of the one or more points comprises:
determining a velocity constraint for each of the one or more points based on the distance and direction from the vehicle to an obstacle on which the one or more points appear.

26. The non-transitory processor readable storage medium of claim 22, wherein the stored processor-executable instructions are configured to cause the processor of the vehicle to perform operations such that:
the vehicle navigation instruction includes a direction component, and
selecting the velocity solution from the determined one or more velocity solutions based on the vehicle navigation instruction comprises selecting the velocity solution having a direction component that most closely matches the direction component of the vehicle navigation instruction.

27. The non-transitory processor readable storage medium of claim 22, wherein the stored processor-executable instructions are configured to cause the processor of the vehicle to perform operations such that:
the vehicle navigation instruction includes a speed component, and
selecting the velocity solution from the determined one or more velocity solutions based on the vehicle navigation instruction comprises selecting the velocity solution having a speed component that most closely matches the speed component of the vehicle navigation instruction.

* * * * *